United States Patent [19]
Lund et al.

[11] 3,783,176
[45] Jan. 1, 1974

[54] CONNECTION BETWEEN ELECTRICAL CONDUIT AND ENCLOSURE, AND METHOD

[75] Inventors: Alvin R. Lund; Jack Kaufman, both of Chicago, Ill.

[73] Assignee: Markstone Manufacturing Company

[22] Filed: Dec. 4, 1972

[21] Appl. No.: 311,848

[52] U.S. Cl. ............... 174/65 R, 29/515, 285/192, 285/382
[51] Int. Cl. ............................................. H02g 3/18
[58] Field of Search .......................... 174/65 R, 64; 285/128, 203, 200, 192, 382; 29/515, 520

[56] References Cited
UNITED STATES PATENTS
2,120,993  6/1938  Selig ................................. 174/65 R
3,181,584  5/1965  Borowsky ........................ 29/520 X Primary Examiner—Bernard A. Gilheany
Assistant Examiner—David A. Tone
Attorney—Axel A. Hofgren et al.

[57] ABSTRACT

A connection between a metal electric conduit and a metal enclosure wall is made by punching a hole in the wall which is circular except for the end portion of a tongue that extends into one side of the circle, shearing two slits in the wall which intersect the hole and define the sides of the tongue, bending the tongue out of the plane of the wall sufficiently to withdraw its end portion from the hole so the latter is effectively round, inserting the end of the conduit, and pressing the tongue back substantially into the plane of the wall to clamp the conduit in the hole.

14 Claims, 7 Drawing Figures

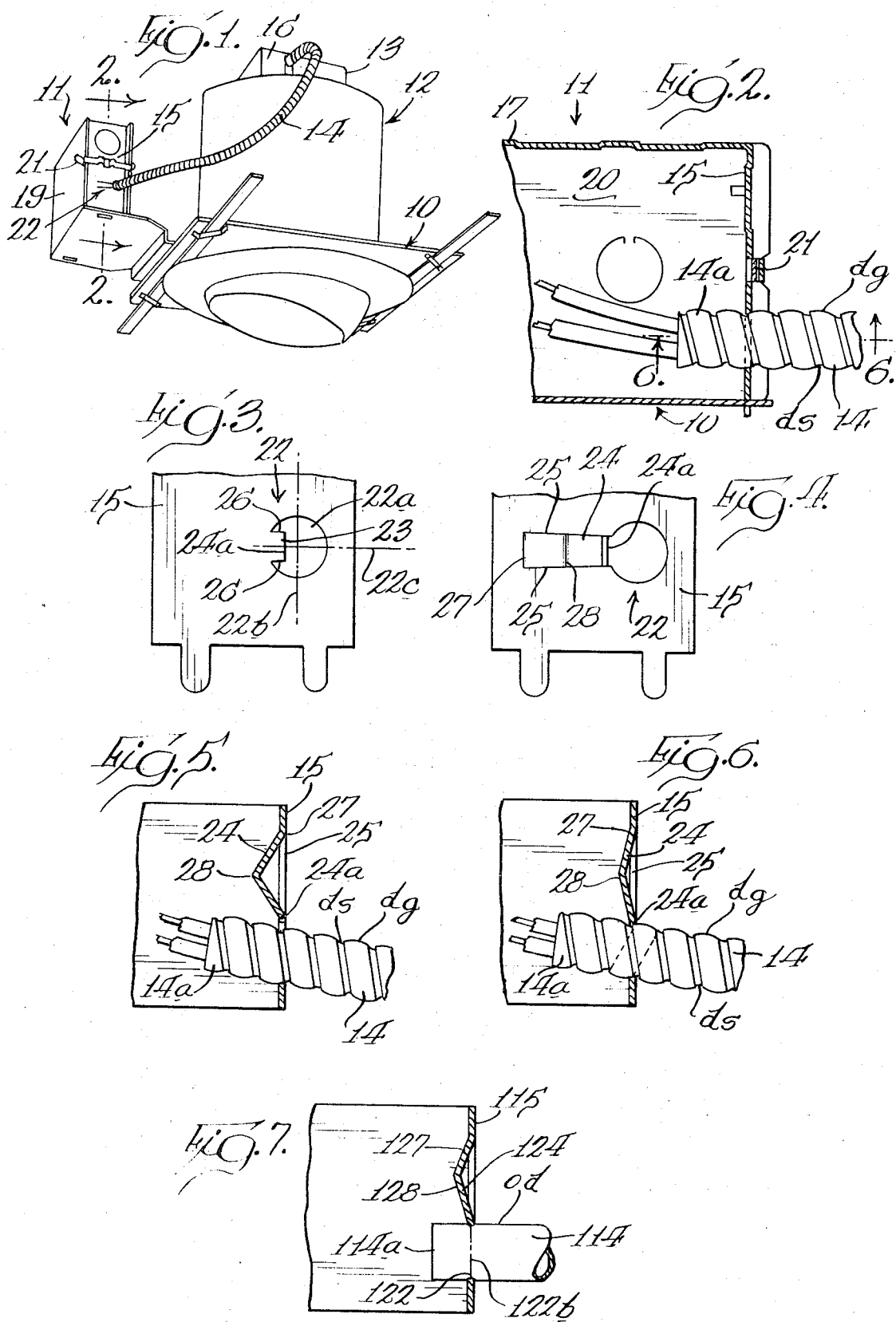

CONNECTION BETWEEN ELECTRICAL CONDUIT AND ENCLOSURE, AND METHOD

BACKGROUND OF THE INVENTION

Electrical wiring which is within the walls of buildings, above the ceiling, or under the floor, must be carried in a metal conduit which is either rigid metal pipe or, in many instances, flexible BX conduit. The wiring, of course, must be spliced to convenience outlets, lighting fixtures, etc. and to permit this the open end of the conduit must extend through a wall of a metal enclosure such as a splice box, a junction box, or the like; and the conduit must be firmly secured to the enclosure.

Further, in the lighting industry a recognized class of recessed lighting fixtures is "pre-wired"—i.e., fixtures in which there is a splice box mounted on the plaster frame alongside the lighting fixture housing, with a conduit extending from the splice box into the housing or into a box on top of the housing. The wiring from the lamp socket extends through the conduit and has bare ends inside the splice box for easy connection to the building wiring which is in a conduit that is connected through another wall of the splice box.

The present practice for connecting the open end portion of a conduit through the wall of a metal enclosure requires the use of a clamping collar loosely mounted on the conduit outside the wiring box wall and having a threaded sleeve extending through the wall, a clamping nut surrounding the end portion of the conduit inside the splice box and screwed onto the inwardly projecting sleeve of the collar, and a set screw in the collar which is screwed tightly against the conduit wall to keep the conduit from being pulled out of the collar. The assembly is relatively cumbersome and requires two extra parts for each connection between a conduit and a metal enclosure wall.

The conventional means of connecting the conduit through the wall of a splice box is particularly undesirable in the manufacture of prewired recessed lighting fixtures, both because of the inventory of connector collars and nuts which must be maintained, and because of the expensive manual operation of connecting one end of the conduit to the splice box and the other end to the housing or the wiring box on top of the housing. There has been a long existing need for a quicker, simpler, and less expensive arrangement for connecting the open end of a conduit through a metal wall of an enclosure in which a splice is to be made.

SUMMARY OF THE INVENTION

In accordance with the present invention, the conventional connecting collar and nut are eliminated, and the open end portion of a piece of conduit is directly clamped into a wall of the enclosure within which a wiring splice is to be made.

This is accomplished by punching in the enclosure wall a hole which is circular except for the end portion of a tongue which extends into one side of the circle, so the hole has a major axis, and a minor axis which bisects the tongue. The length of the major axis is such that if the hole were round and of the diameter of the major axis the conduit would make an easy sliding fit in the hole. When the conduit is BX, which has two different outside diameters, the minor axis of the hole is shorter than the smaller outside diameter of the BX.

Two spaced slits are sheared in the wall intersecting one side of the hole to define the sides of the tongue, which is bisected by the minor axis. By bending the tongue out of the plane of the wall, and preferably into the enclosure, the effective length of the minor axis is increased to be at least equal to the major axis, so that the open end portion of a conduit may be extended through the opening in the wall. Preferably the tongue is bent out of the plane of the wall along its base and has another bend between its ends so that the free end portion remains substantially in the plane of the wall, but does not project into the circle. The dimensions are such that the fastening will accommodate either ½ inch or ⅜ inch BX conduit.

When the conduit is extended through the opening, the tongue is bent back substantially into the plane of the wall to clamp the conduit firmly between the end of the tongue and the opposite side of the hole.

Splice boxes and similar enclosures are generally made from sheet steel of a rather restricted thickness range to meet Underwriters Laboratory requirements. A conduit end connected to such a steel enclosure wall by the above described method cannot be disengaged from it without using special tools that are capable of again bending the tongue out of the plane of the enclosure wall so as to release the clamping force on the conduit. Accordingly, once such a connection is made it is permanent.

THE DRAWINGS

FIG. 1 is a perspective view of a typical prewired recessed lighting fixture which has BX between a splice box and a lamp housing box;

FIG. 2 is a fragmentary vertical sectional view, on an enlarged scale, taken substantially as indicated along the line 2—2 of FIG. 1;

FIG. 3 is a plan view of the splice box wall after the hole has been punched, but before the two slits are formed to define the sides of the tongue;

FIG. 4 is a view like FIG. 3 after the slits are formed and the tongue is bent out of the plane of the wall;

FIG. 5 is a transverse sectional view taken along the lines 5—5 of FIG. 4 with the end portion of a ½ inch BX conduit extending through the wall;

FIG. 6 is a sectional view similar to FIG. 2 but with the section cut at right angles to that of FIG. 2; and FIG. 7 is a view similar to FIG. 2, of a pipe conduit fastened into an enclosure wall.

DETAILED DESCRIPTION OF THE INVENTION

Referring to the drawings in greater detail, and referring first to FIG. 1, a recessed lighting fixture consists generally of a plaster frame, indicated generally at 10; a splice box, indicated generally at 11, mounted on one side of the plaster frame; a lamp housing, indicated generally at 12, which is removably mounted in the plaster frame; and a wiring box, indicated generally at 13, which surmounts the housing. A length of BX conduit, indicated generally at 14, extends through a wall 15 of the splice box and through a wall 16 of the junction box. The open ends of the metal conduit 14 are secured to the walls 15 and 16 in accordance with the teaching of the present invention, and since both connections are alike only the connection with the wall 15 will be described in detail.

The plaster frame 10 and splice box 11 are constructed in accordance with U. S. Pat. No. 3,100,579, and so are described only to the extent required for the present disclosure. The splice box 11 consists of a U-shaped metal strap which has its two ends staked to the plaster frame and defines the end wall 15 through which the conduit 14 extends, a top wall 17 and an opposite end wall (not shown). Removable splice box face plates 19 and 20 have lugs hooked into the end wall (not shown) and are clamped against the end wall 15 by means of a spring clip connector 21. The conduit 14 has an open end portion 14a within the splice box and is firmly connected to the splice box wall 15 in accordance with the present invention.

The conduit 14 is connected to the splice box wall 15 and the junction box wall 16 before the latter are assembled with the other components of the recessed lighting fixture. The first step in the connection of the conduit 14 to the splice box wall 15 is to punch in the wall 15 a hole 22 (FIG. 3) at least a half 22a of which is a segment of a circle of a radius slightly greater than the greater outside diameter dg of the conduit 14, to provide a major axis 22b; and the end portion 23 of a tongue 24 projects into one side of the hole 22 to provide a minor axis 22c which is shorter than the smaller outside diameter ds of the conduit. The major axis is such that if the hole 22 were round and of a diameter equal to the major axis, the conduit 14 would slide easily through the hole with very slight radial looseness. To accommodate both ½ inch and ⅜ inch BX, the major axis 22b is 0.520 inch ±0.001 and the minor axis 22c is 0.37 inch ±0.002.

The metal wall 15 is then provided with two spaced slits 25 which intersect one side of the hole 22 as extensions of the sides 26 of the end portion 23 of the tongue and said slits define the sides of the tongue 24.

The next step in the method is to bend the tongue 24 out of the plane of the wall 15 along its base 27; and as seen in FIG. 5, the tongue has an intermediate return bend along a line 28 which is substantially on the transverse mid-line of the tongue. As seen in FIG. 5, the inner end 24a of the tongue is outside the circle, but still in the plane of the wall as permitted by the divergence of the slits 25. Preferably the direction of the bend 27 at the base of the tongue is such that the tongue projects from the wall 15 in the direction which will be inside the splice box 11 when the box is mounted on the plaster frame 10. Thus, when the assembly of the conduit with the wall 15 is complete, any attempt to pull the conduit out of the wall only causes the end 25 of the tongue to clamp the conduit more tightly against the opposite side of the hole 22.

The distance that the tongue 24 is bent inwardly with respect to the wall 15 is sufficient to lengthen the minor axis 22 until it is at least as long as the major axis 22b. This, then, permits the end portion 14a of the conduit 14 to be introduced through the opening which is now effectively round. The conduit and splice box wall are then held so that there is no relative motion between them, and the tongue is pressed back as nearly as possible into the plane of the wall 15. This causes the free end 24a of the tongue to cut into the conduit and clamp it firmly against the opposite side of the hole 22 approximately across the smaller diameter ds of the BX.

FIG. 6 illustrates the structure with ½ inch BX clamped into the wall 15, and the tongue 24 still has a substantial angle at the line 28. Even with ⅜ inch BX it is not possible to return the tongue precisely into the plane of the wall 15, so that in the final assembly the intermediate portion of the tongue 24 is slightly inside the plane of the wall 15 and there are still perceptible bend lines where the bends 27 and 28 were made.

As a matter of convenience in the factory assembly of a conduit 14 with a wall 15 a simple hydraulic press may be provided which has an anvil for the outer face of the wall 15 with a clearance for the end portion 14a of the conduit 14, and a movable press member which bears upon the tongue 24 to press the latter toward the anvil and return it as nearly as possible to a position in the plane of the wall 15.

For on the job connection of the conduit end to a wall of a metal enclosure which is to be mounted on a building wall, specially shaped plier-like means of very high mechanical advantage may be provided to manually squeeze the tongue substantially into the plane of the enclosure wall.

Such a hydraulic press or hand tool, while not strictly conventional, is well within the skill of the ordinary mechanic to construct for the special purpose of completing the assembly method of the present invention.

FIG. 7 illustrates the present invention as applied to rigid conduit 114 which is connected to an enclosure wall 115. In this case, the wall 115 is provided with a hole 122 which has a minor axis that is somewhat shorter than the outside diameter OD of the rigid conduit 114. A tongue 124 is precisely like the tongue 24, and in the assembled position of FIG. 7 it has a bend line 127 at its base and an intermediate bend line 128.

The assembly is made in precisely the same way as that heretofore described, and the tongue, when in the assembled position of FIG. 7, clamps the conduit 114 firmly against the opposite edge of the hole 122.

The foregoing detailed description is given for clearness of understanding only and no unnecessary limitations should be understood therefrom, as modifications will be obvious to those skilled in the art.

We claim:

1. A method of connecting the open end portion of a metal conduit for electric conductor wires through a metal wall of an enclosure, so that wires in the conduit may be spliced within said enclosure, said method comprising the steps of:

punching a hole in said wall which is substantially circular except for the end portion of a tongue which extends into one side of the circle, said hole having a major axis slightly longer than the outside diameter of the conduit and a minor axis substantially bisecting the tongue which is shorter than said outside diameter;

cutting two slits in the wall which intersect the hole and define the sides of said tongue;

bending said tongue out of the plane of the wall to extend the effective length of the minor axis so it is no less than the major axis;

inserting the open end portion of the conduit through said hole;

and pressing the tongue toward the plane of the wall to clamp the conduit between the end of the tongue and the opposite side of the hole.

2. The method of claim 1 in which the tongue is bent along its base to incline it with respect to the wall and is also bent intermediate its ends so the free end of the tongue is substantially in the plane of the wall.

3. The method of claim 2 in which the tongue is bent along its base toward the rear of the wall.

4. The method of claim 1 in which the tongue is bent along its base toward the rear of the wall.

5. The method of claim 1 in which the slits diverge slightly away from the hole, so the free end of the tongue may remain in the plane of the wall.

6. The method of claim 1 in which the conduit is BX, and the minor axis of the hole is shorter than the smaller outside diameter of the BX.

7. In an electrical device, in combination:
   a metal enclosure having a wall in which there is a hole which is substantially circular except for the end portion of a tongue which extends into one side of the circle, so the hole has a major axis, and a minor axis substantially bisecting the tongue;
   two slits in said wall which intersect said one side of the hole and define the sides of the tongue, said end of said tongue being substantially in the plane of the wall, and said tongue having a bend line across its base;
   and a metal conduit for electrical conductor wires which extends through said hole and has an open end in the enclosure, the outside diameter of said conduit being slightly less than the length of the major axis of the hole and slightly greater than the length of the minor axis of said hole, and said conduit being clamped between the free end of the tongue and the opposite side of the hole.

8. The combination of claim 7 in which the tongue is displaced slightly toward the inside of the enclosure.

9. The combination of claim 8 in which the tongue has a first bend line where it joins the wall and a second bend line intermediate said first bend line and its free end.

10. The combination of claim 7 in which the conduit is BX and the minor axis of the hole is slightly shorter than the smaller diameter of the conduit.

11. In a wiring box for splicing electrical conduit wires:
    a wall in which there is a hole which is substantially circular and of a diameter slightly greater than that of an electrical conduit which may be inserted through said hole;
    and a tongue formed in said wall, said tongue having a base joining the wall and a free end immediately adjacent a side of the hole, a first transverse bend substantially at said base and a second transverse bend between the base and the free end, so that the tongue between its base and its free end is out of the plane of the wall,
    whereby said tongue may be bent toward the plane of the wall to move its free end into the hole and clamp a conduit between said free end and the opposite side of the hole.

12. The wiring box of claim 11 in which the tongue is within the box.

13. The wiring box of claim 11 in which the second transverse bend of the tongue is such that the free end of the tongue is substantially in the plane of the wall.

14. The wiring box of claim 13 in which the tongue tapers from its base to its free end, and the free end is in the plane of the wall.

* * * * *